United States Patent [19]  [11] 4,235,748
Berchielli et al. [45] Nov. 25, 1980

[54] METHOD OF MAKING IMPROVED HYDROGENATION CATALYST

[75] Inventors: Aldo S. Berchielli, Westerly, R.I.; Roland F. Chireau, Quaker Hills, Conn.

[73] Assignee: Yardney Electric Corporation, Pawcatuck, Conn.

[21] Appl. No.: 16,219

[22] Filed: Feb. 28, 1979

[51] Int. Cl.$^3$ .................. B01J 21/18; B01J 31/06; B01J 37/04; H01M 4/88
[52] U.S. Cl. ....................... 252/430; 252/425.3; 252/447; 264/127; 264/105; 427/115; 429/42
[58] Field of Search .................. 252/430, 447, 425, 3; 429/42; 427/115; 264/105, 127

[56] References Cited

U.S. PATENT DOCUMENTS

| | | | |
|---|---|---|---|
| 3,152,201 | 10/1964 | Kumnick | 264/127 |
| 3,310,434 | 3/1967 | Kordesch et al. | 427/115 |
| 3,316,124 | 4/1967 | Kromenberg | 427/115 |
| 3,676,222 | 7/1972 | Deibert | 429/42 |
| 4,035,260 | 7/1977 | Schmitt, Jr. et al. | 252/447 |
| 4,159,367 | 6/1979 | Berchielli et al. | 429/38 |

*Primary Examiner*—P. E. Konopka
*Attorney, Agent, or Firm*—Donald E. Nist

[57] ABSTRACT

The present invention provides a method of making an improved catalyst useful for hydrogenation of organic compounds and in other reactions. The method comprises mixing a porous particulate refractory support material with a hydrophobic polymeric binder to form an essentially homogeneous mixture and then catalyzing this mixture by introducing into the pores of the mixture a salt of a metal of the eighth group of the Periodic Table in a non-polar solvent in which the salt is ionizable. Further in accordance with the method, the salt is reduced to the catalytic metal within the pores of the mixture, specifically within the pores of the support material, by contacting with a selected reducing agent, for example, hydrazine or sodium bis (2-methoxyethoxy) aluminum hydride, preferably in solution. A porous structure is formed from the mixture either before or after the catalysis. Preferably, the structure is sintered as a final step. The support material in the mixture is preferably activated carbon having an average particle diameter of about 0.01–0.3 microns and the structure preferably has pores of an average diameter of about 30–300 A°. Most preferably, the binder is polytetrafluoroethylene. During the mixing step, the mixture is sheared to a fine filament-like fibrous structure of a uniform spongy nature with no grossly detectable free carbon or polytetrafluoroethylene particles.

9 Claims, No Drawings

METHOD OF MAKING IMPROVED HYDROGENATION CATALYST

BACKGROUND OF THE INVENTION

1. Field of the Invention

The present invention generally relates to catalysts and more particularly relates to a method of providing an improved hydrogenation catalyst employing a very low concentration of selected metal.

2. Prior Art

Various types of hydrogen electrodes for metal-hydrogen electrochemical cells were originally developed for alkaline fuel cells and are commercially available. Those fuel cell electrodes invariably consist of an active catalyst material which is either platinum or palladium deposited with a binder on a thin conducting screen. Typically, the catalyst material is present in a substantial concentration; for example, when the catalyst is platinic oxide it may contain 9 mgs of platinum per square centimeter and in many instances contains substantially more platinum than that. One such typical fuel cell electrode has platinum black in a concentration of about 9 grams per sq. ft. in a polytetrafluoroethylene binder with a 70 mesh nickel screen backing the catalyst. Such electrodes are disclosed in U.S. Pat. Nos. 3,990,910, 3,444,004, 3,533,851, 3,553,022 and 3,432,355.

Hydrogen electrodes which are designed primarily for use in fuel cells in the anodic mode, that is, only for discharging, as compared with nickel-hydrogen usage where the electrode must be used for both charging and discharging, exhibit severe shortcomings when operated in a long term cycling mode. It would therefore be desirable to provide an improved, more efficient rechargeable metal-hydrogen electro-chemical cell.

Various types of catalysts have been used for the hydrogenation of such organic compounds as acetone and methylethyl ketone to the corresponding alcohols. Other catalysts have been employed in the hydrogenation of aldehydes, aliphatic and aromatic nitro compounds and carbon double bonds. Still other catalysts have been utilized in the oxidation of formaldehyde and formic acid. It would be desirable to provide an improved catalyst which could function efficiently for a number of such reactions, as well as exhibiting very high activity in a metal-hydrogen electrochemical cell.

SUMMARY OF THE INVENTION

The improved method of the present invention provides an improved catalyst which satisfies the foregoing needs. Thus, the catalyst is useful for a number of types of activities including hydrogen reactions with various organic compounds and as an extremely active catalyst for a rechargeable metal-hydrogen electrochemical cell. The method is substantially as set forth in the Abstract above and the catalyst can be produced thereby at relatively low cost. The catalyst is durable, efficient and easily made.

The method of the present invention involves mixing a porous particulate refractory support material, preferably activated carbon of controlled particle size, with a hydrophobic polymeric binder such as polytetrafluoroethylene to form an essentially homogeneous porous mixture and then catalyzing this mixture. The catalyzing is accomplished by first introducing into the pores of the mixture a salt of a metal of the 8th group of the Periodic Table in a non-polar solvent in which the salt is ionizable. The concentration of the salt so introduced is regulated so that when the metal of the salt is produced from the salt in situ, the concentration of that metal which will serve as the catalyst will be at least about 0.1 mg/cm$^2$ of the mixture. In accordance with the method, the catalysis is completed by reducing the salt in situ by contacting it with hydrazine or another selected reducing agent for the salt. Before or after the catalysis the mixture preferably is formed into a self-supporting porous structure which can be backed with a suitable metallic support and can be sintered, etc. Such a structure is a highly effective anode in a metal-hydrogen electrochemical cell.

The catalyst also has been successfully used in catalyzing the hydrogenation of acetone and methylethyl ketone to their corresponding alcohols. It is also effective in the hydrogenation of selected aldehydes, of aromatic and aliphatic nitro compounds and of various carbon double bonds. Further features of the present invention are set forth in the following description.

DETAILED DESCRIPTION

In accordance with the method of the present invention, a porous particulate refractory support material is mixed with a hydrophobic polymeric binder to form an essentially homogeneous porous mixture.

The refractory support material can be any one of a number of particulate materials such as zeolites, alumina, beryllia, ceramics comprising a mixture of various refractory oxides and the like but preferably is activated carbon. It has been found that in order to achieve the desired effects, the average particle diameter of the support material should be between about 0.01 and about 0.3 microns and the surface area of the material should be of the order of about 500–600 sq. meters per gram in the case of activated carbon and a proportionate surface area per gram when another refractory support material is used in place of the activated carbon. When, for example, various activated carbons were utilized as the support material in accordance with the present method, such activated carbons varying in surface area between 500 and 1000 sq. meters per gram, only those activated carbons which had surface areas between about 500 and 600 sq. meters per gram were satisfactory, the other activated carbons giving poor or worse results in terms of activity of the catalyst prepared therefrom by the present method.

The most satisfactory activated carbon material found thus far for use in the present method comprises an activated carbon with a tri-modal pore volume distribution with peaks in the pore radii ranges of 20A°, 100A° and 3,000A° and with a pore volume of about 0.95 ml per gram. Regardless of the particular refractory support material utilized, the pores of the material should have an average diameter in a range of about 30A° to 300A°.

The hydrophobic polymeric binder which is used with the porous particulate refractory support material to form the desired mixture is preferably polytetrafluoroethylene which is initially in the form of a free flowing powder having an average particle diameter of about 30 to 40 microns but which upon blending and shearing during the mixing forms a filament-like fibrous structure which traps the particulate refractory support material so that when the mixture is run through a micro pulverizer it becomes uniform and spongy with no visible traces of free refractory support material or binder. In place of polytetrafluoroethylene, one could use various fluoroethylene polymers and the like in dispersion or emulsion forms, etc.

Any suitable concentration of the binder relative to the refractory support material can be used. For example, the binder may be present in a concentration of about 10–40% by wt. of the mixture of the support material and binder, depending upon the particular binder and the particular support material. The concentration of the binder is selected so that it is sufficient to trap essentially all of the support material particles. Usually, when the binder is tetrafluoroethylene and the particles are activated carbon, the concentration of the binder will be about 25–35% by wt. of the mixture.

The mixing step of the present method can be effected in any suitable way. For example, the particulate binder and refractory material can be physically mixed together to provide a substantially uniform mixture, after which this mixture can be blended under pressure, that is, sheared by passage through, for example, a ribbon blender and micro-pulverizer so as to obtain an essentially homogeneous porous mixture. Preferably, as previously described, the binder is a polytetrafluoroethylene which assumes a fine filament-like fibrous spongy structure during the mixing, blending and shearing operations so that it totally traps the carbon particles and so that no free carbon or polytetrafluoroethylene is visible in the fully mixed material. This particulate mixture can then be screened through a suitable screen, for example, 50 U.S. Standard mesh or the like.

Further, in accordance with the method of the present invention, the essentially homogeneous porous mixture prepared as described above is catalyzed by introducing into the pores of the support material a salt of the metal which is to serve as the catalyst. Thus, a salt of a metal of the 8th group of the Periodic Table is employed. The metals comprising the 8th group of the Periodic Table are iron, cobalt, nickel rhodium, ruthenium, palladium and platinum. Preferably, the noble metals of that group, namely, rhodium, ruthenium, palladium and platinum are used as the catalyst. Typical salts are palladium nitrate, rhodium nitrate, potassium hexachloroplatinate, rhodium sulphate and ruthenium chloride.

It is necessary to introduce the salt into the support material in the mixture in a non-polar solvent such as dimethyl formamide or the like, in which the salt is ionizable. For example, acetone can be used with palladium nitrate, 1, 3 dioxane and chloroform can be used with platinum (IV) tetrachloride. It is also necessary to provide a sufficient concentration of the salt in the support material pores so that the metal catalyst when formed from the salt in the support material in the mixture will be in an effective concentration of at least about 0.1 mg/cm$^2$ of the mixture. This extremely low concentration of the metal catalyst is nevertheless many times more active than conventional catalyst of much higher concentration.

The catalyst is completed by reducing the thus-introduced salt with a selected reducing agent for the same. Hydrazine is preferred as a reducing agent. So also is sodium bis (2-methoxyethoxy) aluminum hydride. Introduction of the reducing agent normally requires the use of some carrier for the reducing agent. For example, an aqueous alkaline (pH 9–10) solution containing about 10% by wt. of hydrazine can be successfully introduced into the pores of the carbon or other support material in the mixture so as to effectively reduce the salt in situ to the desired metal catalyst. The amount of reducing agent used should be sufficient to completely reduce the salt in the pores of the support material.

After the salt reduction is completed, the reaction products other than the catalyst metal formed in situ in the pores of the mixture are removed, as by washing the mixture with water or by extraction, preferably with a water-miscible solvent such as acetone. After the washing operation is completed so as to remove the alkali, water, unreacted hydrazine or other reducing agent and the like, the mixture preferably is dried at, for example, about 100° C. for 30 minutes and they may be sintered, for example at about 680° F. in the case of polytetrafluoroethylene, or other suitable sintering temperature for the binder, for, for example, about 30 minutes.

The porous mixture either before or after catalysis can be formed into a selected suitable structure, depending upon its ultimate use. For example, the mixture can be cold pressed into a suitable sheet form having an average thickness of about 0.4 mm and a weight of about 180 mg/cm$^2$. It can then be laminated onto a flattened conductive metal screen such as an expanded nickel screen which has been previously coated with fluoroethylene polymer or the like. Such lamination can be carried out under elevated heat and pressure, for example about 350° C. and two tons per sq. in. for two minutes to provide the anode (hydrogen electrode) for an improved metal-hydrogen cell such as is more particularly described in copending U.S. application Ser. No. 920,586, filed June 29, 1978 entitled Improved Hydrogen Electrode, Electrochemical Cell and Rechargeable Metal-Hydrogen Battery of which the present inventors are the inventors, said application having been assigned to the assignee of the present application, namely Yardney Electric Corporation. Such an anode may, for example, be formed by the present method from a mixture of polytetrafluoroethylene (25–35% by weight of the mixture) and activated carbon. The anode may have a catalyst loading of about 0.1 mg/cm$^2$ of palladium (formed from palladium nitrate), an average pore size for the carbon layer thereof of about 5–10 microns and a surface area for that carbon layer of about 500–600 m$^2$ per gram. The carbon is of the previously described tri-modal type with peaks in the pore radii ranges of 20°A°, 100A° and 3,000A° and a pore volume of about 0.95 ml. per gram. The activity of the electrode as an absorber of hydrogen is about four times greater than that of a platinic oxide catalyst electrode containing 9 mg. Pt/cm$^2$.

Further specific examples of the improved method of the present intention are set forth below:

EXAMPLE I

A series of hydrogen electrodes are made in accordance with the present method utilizing the ingredients set forth in Table I below:

TABLE I

| Sample No. | binder | support material | salt | reducing agent | catalyst conc. |
|---|---|---|---|---|---|
| 1 | polytetrafluoroethylene(PTFF) 30 wt.-% of mixture | activated carbon A 500 m$^2$/gm surface area | rhodium sulfate in acetone | hydrazine in aqueous alkaline (pH 9) solution | 0.2 mg/cm$^2$ |
| 2 | fluorinated ethylene | activated carbon B | potassium hexachloro- | sodium bis (2- | 0.3 mg/cm$^2$ |

TABLE I-continued

| Sample No. | binder | support material | salt | reducing agent | catalyst conc. |
|---|---|---|---|---|---|
|  | propylene (FEP) 25 wt.-% of mixture | 600 m²/gm surface area | platinate in 1,3 dioxane | methoxyethoxy) aluminum hydride |  |
| 3 | polytetrafluoroethylene 10 wt.-% of mixture | powdered alumina 200 m²/gm surface area | ruthenium tetrachloride in methyl ethyl ketone | hydrazine in alkaline (pH 10) water | 0.3 mg/cm² |
| 4 | polyvinylidene fluoride 17 wt.-% of mixture | zeolite (crystalline alumino-silicate) 300 m²/gm surface area | nickel nitrate in dimethylformamide | sodium bis (2-methoxyethoxy)aluminum hydride | 0.5 mg/cm² |

Each of samples 1, 2, 3 and 4 are prepared by mixing the binder and support material together and then running the mixture through a ribbon blender and micro pulverizer to provide an intimately mixed substantially homogeneous porous product. This resulting mixture is, in the case of sample 1, catalyzed before it is formed into a self-supporting structure, whereas in the case of samples 2, 3 and 4 a self-supporting structure is formed first from the mixture before the catalysis. The catalysis is carried out by introducing the salt in the non-polar solvent into the mixture, specifically, the pores of the self-supporting material, followed by contact of the salt and in situ conversion thereof by the reducing agent in the pores to the desired catalyst. In each case, the catalysis is followed by washing with water and drying of the mixture at 100° C.

The catalyzed or uncatalyzed mixture is then cold pressed into a flat sheet of about 0.5 mm thick and laminated to a flat expanded nickel screen which has been previously coated with fluoroethylene copolymer. In each case the lamination is carried out at about 350° C. and under about two tons per sq. in. pressure for two minutes. The temperature is adjusted if necessary to the sintering temperature of the binder to cause the necessary sintering. Upon cooling, catalysis is carried out if it has not already been carried out on the mixture. The finished hydrogen electrode is tested in an electrochemical cell, in each instance utilizing a cathode comprising sintered silver plaque. The electrolyte is 35 wt.-% solution of potassium hydroxide. The performance characteristics for each of the four samples are set forth in Table II below:

TABLE II

| Sample No. | Hydrogen Pressure (psi) | End of Charge Voltage (volts) | Cell Plateau Voltage on Discharge (volts) |
|---|---|---|---|
| 1 | 100 | 1.76 | 1.10 |
| 2 | 100 | 1.74 | 1.15 |
| 3 | 100 | 1.80 | 1.05 |
| 5 | 100 | 1.82 | .95 |

NOTES:
(a) Charging current density is 15 ma/cm².
(b) Discharge current density is 100 ma/cm².

As can be seen from the results set forth below, each of samples 1 to 4, inclusive, perform satisfactorily as the hydrogen electrode in a metal-hydrogen electrochemical cell. The concentration of catalyst in each hydrogen electrode is well below that used in conventional hydrogen electrodes. Moreover, the hydrogen electrodes produced by the present method have increased electrical activity and durability over conventional hydrogen electrodes employing noble metals as the catalyst.

EXAMPLE II

Each of samples 1 through 4 formed as specified in Example I, are also useful as catalysts in the hydrogenation of certain organic compounds. Thus, acetone and methyl ethyl acetone were converted to their corresponding alcohols, while the hydrogenation of acetaldehyde and benzaldehyde yielded ethyl alcohol and benzyl alcohol, utilizing the catalysts of Example I. Tests on the reduction of allyl alcohol and maleic acid showed that certain of the catalyst samples were rather active in hydrogenating the C=C double bonds. Sample 4 was particularly active for this purpose. Sample 2 was found to be extremely active in hydrogenating nitro groups attached to aromatic rings, (i.e. reduction of aliphatic nitro compounds). Each hydrogenation (or reduction) was carried out according to the following general procedure:

The catalytic efficiency of the various samples was determined by testing for their power of reduction by contacting the organic compounds with the sample catalysts in the presence of stoichmetric quantities of hydrogen. The reactions were carried out in a pressure vessel.

The results of the hydrogenation for each of the catalyst samples 1 through 4 are listed in Table III below, in which are recorded the conditions used for the hydrogenation reaction, the reaction products and their estimated yields.

TABLE III

|  | Compound (g) | Catalyst No. | Sample No. | Temp. (°C.) | Reaction Time (Min) | Product | Yield % |
|---|---|---|---|---|---|---|---|
| 1 | acetone | (29) 2 | 100 | 85 | 376 | isopropyl alcohol | 79 |
| 2 | methyl ethyl ketone | (36) 1 | 100 | 85 | 207 | sec-butyl alcohol | 89 |
| 3 | acetaldehyde | (22) 3 | 100 | 50 | 450 | ethyl alcohol | 90 |
| 4 | allyl alcohol | (29) 3 | 100 | 100 | 255 | n-propyl alcohol | 70 |
| 5 | maleic acid | (12) 4 | 20 | 165 | 106 | succinic acid | 81 |
| 6 | nitromethane | (12) 2 | 60 | 45 | 196 | methyl acetamide | 90 |
| 7 | benzaldehyde | (27) 1 | 100 | 50 | 310 | benzyl alcohol toluene | 96 |

The test results shown above clearly indicate that catalysts prepared in accordance with the present method are useful not only in hydrogen electrodes for electrochemical cells but in a wide variety of hydrogenation reactions, including those involving ketones, aldehydes and selected aromatic and aliphatic nitro compounds.

Various modifications, changes, alterations and additions can be made in the present method, in its steps and in the constituents and parameters for the same. All such modifications, changes, alterations and additions as are within the scope of the present claims form part of the present invention.

What is claimed is:

1. A method of making an improved catalyst for hydrogenation reactions and the like, said method comprising:
   a. mixing a porous particulate refractory support material comprising activated carbon with a hydrophobic polymeric binder comprising polytetrafluoroethylene to form an essentially homogeneous porous mixture, said polytetrafluoroethylene and carbon particles being sheared and blended during said mixing until said polytetrafluoroethylene forms a filament-like, fibrous structure and said mixture is uniform and spongy and without free particles of carbon or tetrafluoroethylene in substantial concentration; and,
   b. catalyzing said mixture by:
      i. introducing into the pores of said support material a salt of a metal of the eighth group of the Periodic Table in a non-polar solvent in which said salt is ionizable, the concentration of said salt being sufficient to provide a metal catalyst concentration of at least about 0.1 mg/cm$^2$, and,
      ii. reducing said salt to said catalytic metal within the pores of said support material by contacting said salt in said pores with a selected reducing agent for said salt.

2. The improved method of claim 1 wherein said mixture is formed into a self-supporting porous structure.

3. The method of claim 2 wherein said structure is sintered after said mixture is catalyzed.

4. The method of claim 2 wherein said support material has an average particle diameter of between about 0.01 and about 0.3 microns and wherein the pores of said mixture have an average diameter of about 30A°-300A°.

5. The method of claim 4 wherein said activated carbon has a tri-modal pore volume distribution with peaks in the pore radii ranges of 20A°, 100A° and 3,000A° and a surface area of about 500-600 sq. meters per gram and wherein said structure has an average pore size of about 5-10 microns.

6. The method of claim 4 wherein said salt comprises palladium nitrate and said non-polar solvent comprises acetone and wherein said reducing of said palladium nitrate to palladium is affected by hydrazine in solution.

7. The method of claim 6 wherein said palladium-containing structure is washed and dried, then sintered.

8. The method of claim 4 wherein said salt comprises rhodium nitrate and said non-polar solvent comprises acetone and wherein said reducing of said salt is effected through the use of sodium bis (2-methoxyethoxy) aluminum hydride in solution.

9. The method of claim 4 wherein said salt comprises potassium hexachloroplatinate.

* * * * *